United States Patent [19]

Donnison et al.

[11] Patent Number: 4,838,149

[45] Date of Patent: Jun. 13, 1989

[54] PISTONS

[75] Inventors: Geoffrey M. Donnison, Midlands; Robert A. Wordsworth; Michael L. P. Rhodes, both of Warwickshire, all of England

[73] Assignee: AE PLC, Rugby, England

[21] Appl. No.: 96,901

[22] Filed: Sep. 15, 1987

[30] Foreign Application Priority Data

Sep. 18, 1986 [GB] United Kingdom ................. 8622538

[51] Int. Cl.[4] ................................................ F16J 1/04

[52] U.S. Cl. ....................................... 92/222; 92/212; 92/213; 123/193 P

[58] Field of Search ................. 92/176, 179, 186, 212, 92/213, 222, 231, 260; 123/193 P, 668, 669

[56] References Cited

U.S. PATENT DOCUMENTS

| | | | |
|---|---|---|---|
| 4,530,884 | 7/1985 | Erickson et al. | 123/193 P |
| 4,531,269 | 7/1985 | LaBouff | 92/189 |
| 4,531,502 | 6/1985 | Mizuhara | 123/193 P |
| 4,552,057 | 11/1985 | Mizuhara | 92/212 |
| 4,553,472 | 11/1985 | Munro et al. | 92/176 |
| 4,590,901 | 5/1986 | Mizuhara | 92/231 |
| 4,592,268 | 6/1986 | Hartsock | 92/212 |
| 4,604,945 | 8/1986 | Mizuhara | 92/212 |
| 4,648,308 | 3/1987 | Matsui et al. | 92/213 |
| 4,651,630 | 3/1987 | Zeilinger et al. | 92/212 |
| 4,709,621 | 12/1987 | Matsui et al. | 92/212 |
| 4,711,208 | 12/1987 | Sander et al. | 123/271 |

FOREIGN PATENT DOCUMENTS

| | | | |
|---|---|---|---|
| 0101566 | 6/1984 | Japan | 123/193 P |
| 0224445 | 12/1984 | Japan | 123/193 P |
| 0175750 | 9/1985 | Japan | 123/193 P |
| 0023558 | 1/1987 | Japan | 123/193 P |

*Primary Examiner*—Robert E. Garrett
*Assistant Examiner*—Tom Denion
*Attorney, Agent, or Firm*—William R. Hinds

[57] ABSTRACT

Pistons for internal combustion engines are described. The pistons comprise a crown component and a skirt component wherein the crown component consists of an iron or nickel based alloy annular portion having fitted directly therein a ceramic insert, the crown component being joined to the skirt component by an annular composite laminated member of steel and aluminium alloy the steel of the laminated member being energy beam welded to the annular portion of the crown component and the aluminum alloy of the laminated member being energy beam welded to the skirt component there being after welding a sealed, hollow, annular chamber disposed at the junction between the crown component and the skirt component. Embodiments are described having ceramic inserts of silicon nitride and including combustion bowls.

11 Claims, 4 Drawing Sheets

PISTONS

The present invention relates to pistons and to methods of manufacture of such pistons for internal combustion engines and particularly to pistons having insulating crowns to reduce the heat loss from the engine combustion processes.

U.S. Pat. No. 4,553,472 of common ownership herewith describes pistons having crowns which are heat insulated from the remainder of the piston. Heat insulation is primarily accomplished by the incorporation of sealed air gaps between the crown and the remainder of the piston. Embodiments are shown where the crown combustion bowl surface is formed of expensive nickel based superalloys to withstand the increased temperatures which heat insulation generates. However, it is known that erosion and corrosion effects on the metal bowl surface can occur in diesel applications in the region of impingement of the fuel jets. For this reason the use of ceramic materials having inherently better resistance to such effects is desirable for forming the combustion bowl. Ceramic materials in most instances also have more desirable heat insulating properties than metals. It has been proposed to use ceramics for combustion bowls before. Indeed in U.S. Pat. No. 4,553,472 the proposal is made. The problem has always been, however, in securing the bowl insert in position for long term endurance which in an automotive diesel truck engine, for example, may need to be of the order of 500,000 miles. Methods using various graded brazes for securing ceramics are very expensive and require very precise process control. Fitting of the insert into the aluminum alloy of the piston has not proved successful due to the high coefficient of expansion of the aluminum alloy relative to the ceramic which either allows the insert to loosen or necessitates an unacceptable degree of interference. However, fitting of ceramic to iron or nickel-base alloys has proved unexpectedly successful.

According to the present invention a piston for an internal combustion engine comprises a crown component and a skirt component wherein the crown component consists of an iron-based or nickel-based alloy annular portion having fitted directly therein a ceramic insert, the crown component being joined to the skirt component by an annular composite laminated member of steel and aluminium alloy the steel of the laminated member being energy beam welded to the annular portion of the crown component and the aluminium alloy of the laminated member being energy beam welded to the skirt component there being after welded a sealed, hollow, annular chamber disposed at the junction between the crown component and the skirt component.

The iron-based or nickel-based alloy annular portion may also include a hollow, sealed cavity within the portion. The cavity may extend around the whole annular portion and itself be annular in form. The cavity may be of varying cross-section around its length. The cavity may be formed by the joining together of two component parts to form the annular portion.

The ceramic insert may also include a combustion bowl in, for example, diesel applications. The bowl may have any desired configuration and be positioned symmetrically or asymmetrically with regard to either the piston crown or the insert.

The ceramic insert may itself comprise two or more different ceramics. The main body of the insert may comprise silicon nitride, for example, whilst the surfaces thereof may be coated with partially stabilised zirconia, for example.

Energy beam welding may be by either electron beam or laser beam.

In order that the present invention may be more fully understood examples will now be described by way of illustration only with reference to the accompanying drawings of which:

Figure 1:
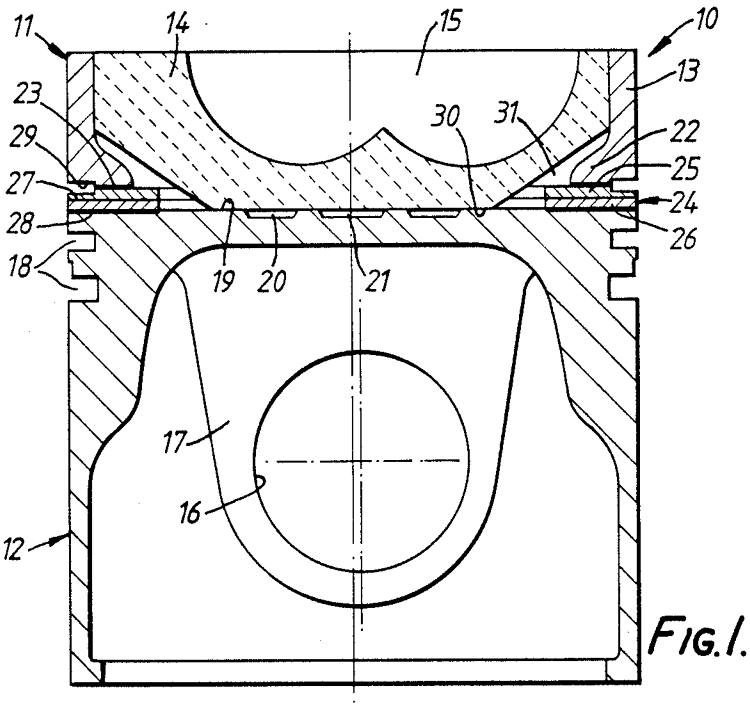
FIGS. 1 to 5 show a section through five alternative embodiments of pistons according to the present invention.

Referring now to FIG. 1 and where similar features are denoted by common reference numerals. A diesel engine piston is shown generally at 10. The piston 10 comprises a crown component 11 and a skirt component 12. The crown component 11 is formed by an annular ring portion 13 made from an iron or nickel based alloy. Shrink-fitted to the ring portion 13 is a ceramic insert 14 having a combustion bowl 15 formed therein. The ceramic material of the insert 14 may, for example, comprise silicon nitride or partially stabilised zirconia (PSZ) or a combination thereof. The skirt component 12 comprises the normal gudgeon pin bores 16, bosses 17 and piston ring grooves 18. Formed in the upper planar surface 19 of the skirt component 12 are depressions 20 and 21. Depression 20 is annular in form. The lower end of the annular ring portion 13 has a radially thickened portion 22 to which is joined by means of an electron beam or laser weld 23 to an annular, laminated bimetallic joining member 24. The member 24 comprises a steel layer 25 and an aluminium alloy layer 26 which have been joined together at the interface 27 by a pressure welding technique such as roll bonding. The crown component 11 is then joined to the upper surface 19 of the skirt component 12 by a second annular electron beam or laser formed weld 28 between the aluminium alloy of the annular member 24 and the aluminium alloy of the skirt 12. Formed at the junction of the steel 25 of the annular member 24 and the thickened portion 22 of the annular ring 13 is the upper piston ring groove 29. After welding of the crown component 11 to the skirt component 12 the lower face 30 of the ceramic insert 14 rests against the upper face 19. An annular air-gap 31 is formed at the junction of the ring portion 13, ceramic insert 14, upper face 19 and annular joining member 24. The air-gap 31 further significantly enhances the heat insulating qualities of the piston and serves to reduce thermally induced stresses at the junction of dissimilar materials.

The ceramic bowl insert may be shrink-fitted after the member 13 has been joined to the skirt component 12.

Where the insert 14 comprises two or more different ceramic materials the second material may be coated on some of the outer surfaces of the main body of the insert. For example, the main body may comprise silicon nitride coated with plasma-sprayed PSZ at the regions where the insert contacts the annular portion and the piston skirt component.

Figure 2:
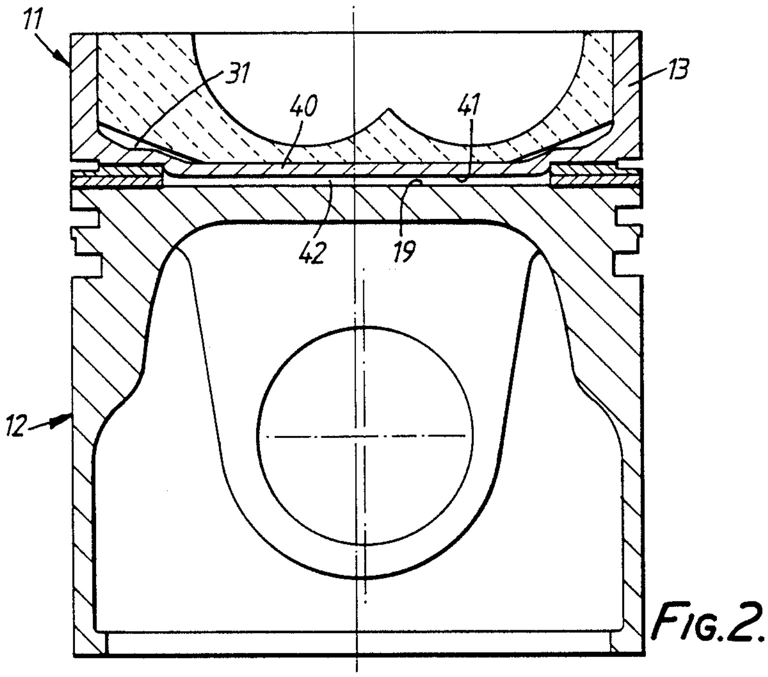

In FIG. 2 the annular ring portion 13 further includes a lower base member 40 the crown component 11 thus incorporating a sealed air gap 31. The crown component 11 is joined to the skirt portion 12 in a similar manner to that of FIG. 1. Formed between the lower face 41 of the base member 40 and the upper face 19 of the skirt component 12 is a sealed air gap 42 which further enhances the insulating properties of the piston.

Figure 3:
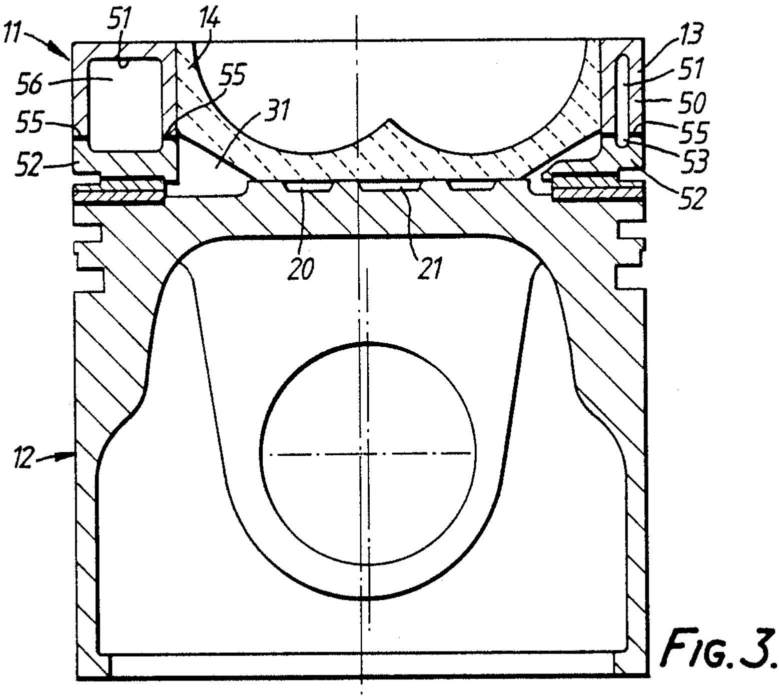

The embodiment shown in FIG. 3 has an annular ring portion 13 which is itself fabricated from two constituent parts. The ring 13 comprises an upper eccentric annular member 50 having an eccentric annular channel 51 therein and a lower annular member 52, which in this case has a shallow eccentric annular channel 53 therein which co-operates with the channel 51 of the upper member 50. The two members 50 and 52 are joined by an electron beam weld 55 to form a hollow, eccentric annular ring 13 having a sealed, eccentric annular chamber 56 therein. Shrink-fitted into the ring 13 is a symmetrical ceramic insert 14. The crown component 11 so formed is joined to the skirt component 12 as described above with reference to FIG. 1. The upper annular member 50 may be formed by casting, forging or machining from a heat and oxidation-resistant iron or nickel-based alloy whilst the lower member 52 may be made from a less highly alloyed and cheaper ferrous material. Alternatively both members may be produced from titanium alloy, the electron beam weld 55 being optionally replaced by a diffusion bond. The use of titanium alloys may be advantageous because of their favourably low coefficients of thermal expansion and also because of their relatively low density.

The offset combustion chamber of FIG. 3 may, of course, be achieved by means of a symmetrical upper annular member 51 and providing a ceramic insert 14 itself having an offset combustion chamber. In a similar manner centrally positioned combustion chambers with respect to the piston crown may be produced by employing symmetrical annular members 50 and 52 and insert 14.

Figure 4:
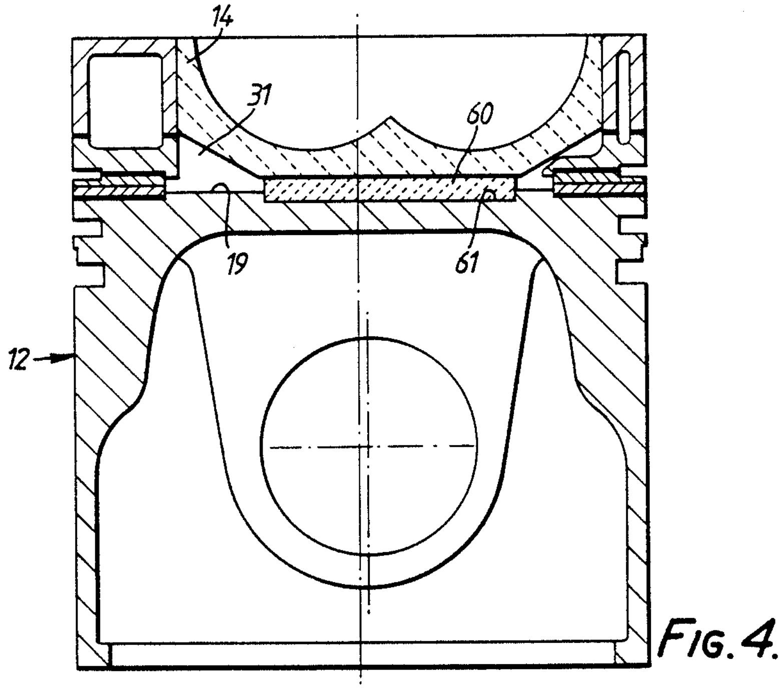

FIG. 4 shows a modification to the embodiment of FIG. 3 in that the air gaps 20, 21 are replaced by a ceramic disc 60 of particularly low thermal conductivity, for example, PSZ. The disc 60 is located in a recess 61 formed in the upper face 19 of the skirt component 12.

The disc 60 may alternatively be located in a corresponding recess in the base of the insert 14 or may merely be located by interference between two substantially flat surfaces.

The disc 60 may not necessarily comprise monolithic ceramic but may be formed from a steel, ferrous alloy or other metal alloy coated with PSZ and where the PSZ layer is placed in contact with the lower face of the insert 14.

Figure 5:
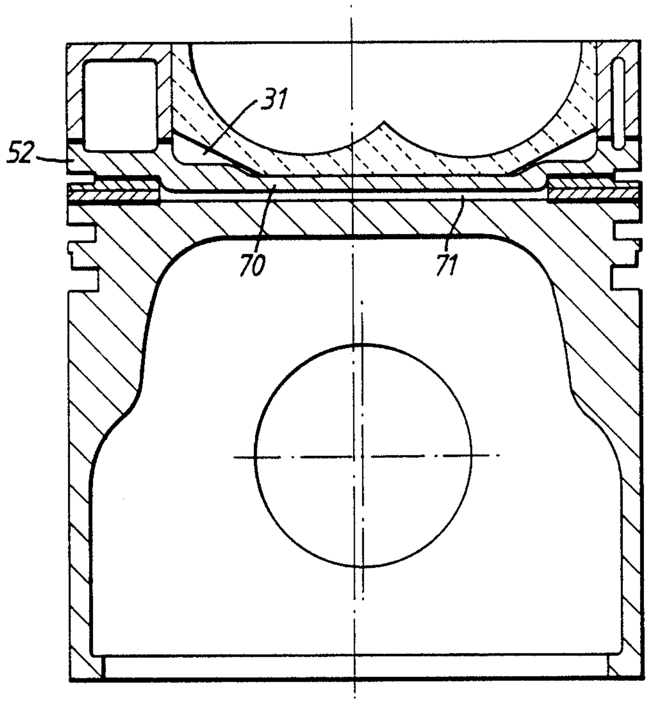

The embodiment of FIG. 5 shows a further modification of the embodiment of FIG. 3 in that the lower member 52 of the ring portion 13 further includes a base member 70 and consequent air chamber 71.

The hollow ring member 13 of the embodiments shown in FIGS. 3, 4 and 5 further improve the heat insulation of the piston crown and, therefore, the performance of the piston.

Figure 6:
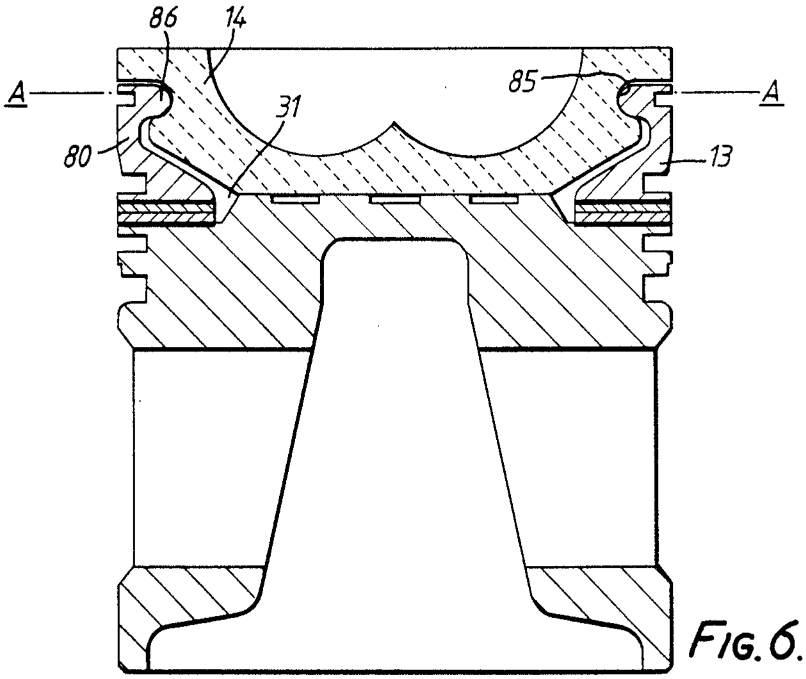
FIGS. 6 and 6A show a sixth alternative embodiment, FIG. 6A being a view of a section through plane AA of FIG. 6.
Figure 6A:
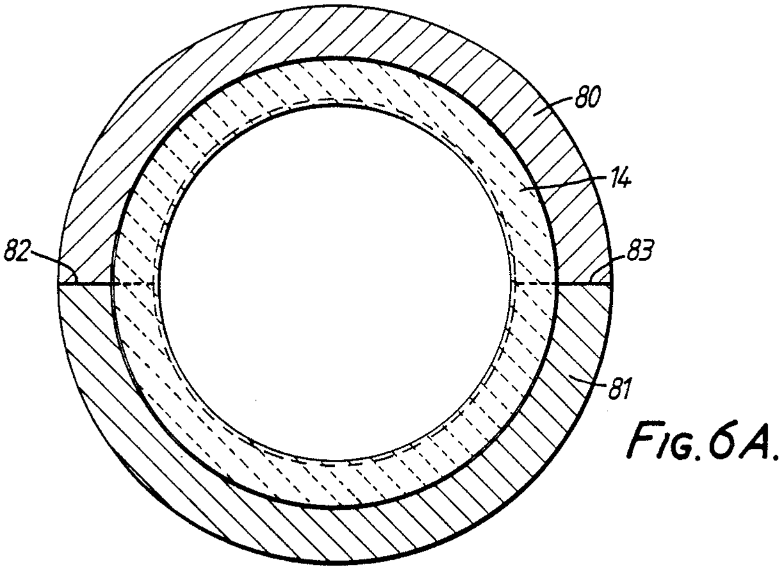

The piston of FIGS. 6 and 6A again has a ring member 13 of fabricated construction. It comprises two substantially semi-circular halves 80 and 81 split about the faces 82 and 83. The ceramic insert 14 is held in the ring by welding together, preferably by a high energy beam method, of the two halves on the faces 82 and 83. The insert 14 is provided with a circumferential channel 85 which co-operates with an inturned flange 86 on the halves 80 and 81. This embodiment does not, therefore, rely only upon an interference shrink-fit between the ring 13 and insert 14. An additional annular air gap 31 is again formed between the crown and skirt portions. This construction is advantageous in that no metal is directly exposed to the combustion gases.

It will be apparent to those skilled in the art that different features of the above embodiments may be combined in combinations other than strictly as exemplified above.

We claim:

1. A piston for an internal combustion engine comprising a crown component and a skirt component wherein the crown component consists of an iron-based or nickel-based alloy annular portion having fitted therein a ceramic insert which is retained by interference, said crown component being joined to said skirt component by an annular composite laminated member of steel and aluminium alloy, the steel of the laminated member being energy beam welded to said annular portion of said crown component, and the aluminium alloy of said laminated member being energy beam welded to said skirt component, there being after welding a sealed, hollow, annular chamber disposed at the junction between said crown component and said skirt component.

2. A piston according to claim 1 wherein said ceramic insert comprises silicon nitride.

3. A piston according to claim 1 wherein said ceramic insert comprises two or more different ceramic materials.

4. A piston according to claim 3 wherein said insert comprises a silicon nitride body at least partially coated with partially stabilised zirconia.

5. A piston according to claim 1 wherein said crown component annular portion also includes a hollow, sealed annular chamber therein.

6. A piston according to claim 5 wherein said hollow, sealed annular chamber in said crown component annular portion is non-symmetrical.

7. A piston according to claim 1 wherein an insulating member is positioned between the lower portion of said ceramic insert and the top of said skirt component.

8. A piston according to claim 7 wherein said insulating member is made of a ceramic material.

9. A piston according to claim 7 wherein said insulating member comprises a metal coated with a ceramic material.

10. A piston according to claim 1 wherein said crown annular portion comprises two components which are joined together by welding along faces which substantially lie in a plane which includes the piston axis.

11. A piston according to claim 1 wherein a piston ring groove is sited at the junction between the annular crown component and the steel of the laminated member such that at least the lower radial face of said piston ring grooves lies in the steel of said laminated member.

* * * * *